(12) United States Patent
Crown et al.

(10) Patent No.: US 8,809,461 B2
(45) Date of Patent: Aug. 19, 2014

(54) MULTIMODAL HETEROPHASIC COPOLYMER AND THERMOFORMED ARTICLES FROM SAME

(75) Inventors: Alechia Crown, Pearland, TX (US); Debra R. Wilson, Missouri City, TX (US); John Kaarto, Missouri City, TX (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 13/096,163

(22) Filed: Apr. 28, 2011

(65) Prior Publication Data

US 2012/0276312 A1      Nov. 1, 2012

(51) Int. Cl.
C08L 23/04      (2006.01)

(52) U.S. Cl.
USPC ........................................................ 525/240

(58) Field of Classification Search
USPC ........................................................ 525/240
See application file for complete search history.

(56) References Cited

U.S. PATENT DOCUMENTS

| | | | |
|---|---|---|---|
| 5,548,042 A | 8/1996 | Goode | |
| 6,455,638 B2 | 9/2002 | Laughner et al. | |
| 6,455,643 B1 | 9/2002 | Harlin et al. | |
| 6,472,474 B2 | 10/2002 | Burkhardt et al. | |
| 7,041,765 B2 | 5/2006 | Tau et al. | |
| 7,470,757 B2 | 12/2008 | Miserque et al. | |
| 7,476,710 B2 * | 1/2009 | Mehta et al. | 525/191 |
| 7,851,554 B2 | 12/2010 | Meka et al. | |
| 2006/0008643 A1 | 1/2006 | Lin et al. | |
| 2006/0142497 A1 | 6/2006 | Stevens et al. | |
| 2010/0105848 A1 | 4/2010 | Meka et al. | |
| 2010/0256304 A1 * | 10/2010 | Bernreitner et al. | 525/232 |
| 2011/0306731 A1 | 12/2011 | Chou | |
| 2012/0165440 A2 * | 6/2012 | Bergstra et al. | 524/108 |

FOREIGN PATENT DOCUMENTS

EP      2223943 A1      9/2010

OTHER PUBLICATIONS

International Search Report and Written Opinion, Int'l Application No. PCT/US12/35520, Jul. 27, 2012.

* cited by examiner

*Primary Examiner* — Nathan M Nutter
(74) *Attorney, Agent, or Firm* — Duane Morris LLP (57) ABSTRACT

Disclosed is a multimodal propylene impact copolymer composition with improved stiffness while maintaining good impact strength. The continuous phase has a broad PI and provides the multimodal propylene impact copolymer composition with excellent processability. Thermoformed articles made from the multimodal propylene impact copolymer exhibit improved rigidity and good impact strength.

13 Claims, 2 Drawing Sheets

MULTIMODAL HETEROPHASIC COPOLYMER AND THERMOFORMED ARTICLES FROM SAME

BACKGROUND

The present disclosure is directed to compositions and articles containing a polypropylene heterophasic copolymer.

The thermoforming art recognizes the need for propylene impact copolymers with improved and varied properties. Propylene impact copolymers with maximum stiffness and toughness are continuously sought after particularly for thermoforming applications where down-gauging is an objective. The thermoformed container market is a focal point whereby the drive to down-gauge converges with efforts to improve moldable polymeric materials. Thermoformed containers with ever-decreasing sidewall thickness, for example, require propylene impact copolymer with improved rigidity and impact strength. Disposable cups are the continuous object for such down-gauging efforts.

A need exists for propylene impact copolymers with improved stiffness and toughness in conjunction with processability suitable for thermoforming operations. A need further exists for propylene impact copolymer with maximum stiffness for down-gauging.

SUMMARY

The present disclosure is directed to a multimodal heterophasic copolymer, i.e., a multimodal propylene impact copolymer composition. The multimodal propylene impact copolymer composition has a multimodal continuous phase and an elastomeric discontinuous phase. The present multimodal propylene impact copolymer composition exhibits improved stiffness while retaining impact resistance and suitable processability for thermoforming applications. The continuous phase has a broad molecular weight distribution which provides the multimodal propylene impact copolymer composition with adaptability to be thermoformed on conventional thermoforming equipment.

The present disclosure provides a composition. In an embodiment, a multimodal propylene impact copolymer composition is provided and includes components (A) and (B).

Component (A) includes from about 85 wt % to about 98 wt % of a continuous phase. The continuous phase includes (1) a first propylene-based polymer with an MFR from about 0.1 g/10 min to about 1.5 g/10 min; and (ii) a second propylene-based polymer. The continuous phase has (iii) a polydispersity index (PI) from about 4.0 to about 6.0.

Component (B) includes from about 15 wt % to about 2 wt % of an elastomeric polymer dispersed in the continuous phase (A). The elastomeric polymer includes an ethylene/propylene copolymer containing from about 55 wt % to about 70 wt % units derived from ethylene. The multimodal propylene impact copolymer composition has one, some, or all of the following properties:

(i) an MFR from about 1.5 g/10 min to about 6.0 g/10 min;
(ii) a flexural modulus greater than about 240 kpsi; and/or
(iii) a notched Izod impact strength from about 1.0 ft-lb/in to about 4.0 ft-lb/in.

In an embodiment, the second propylene-based polymer of the multimodal propylene impact copolymer composition has an MFR greater than the MFR of the first propylene-based polymer.

In an embodiment, the multimodal propylene impact copolymer composition is a nucleated copolymer composition.

In an embodiment, the multimodal propylene impact copolymer composition is formed into a sheet.

The present disclosure provides an article. In an embodiment, a thermoformed article is provided and includes a multimodal propylene impact copolymer composition composed of components (A) and (B).

Component (A) includes from about 85 wt % to about 98 wt % of a continuous phase composed of (i) a first propylene-based polymer with an MFR from about 0.1 g/10 min to about 1.5 g/10 min, and a (ii) a second propylene-based polymer. The continuous phase has (iii) a polydispersity index (PI) from about 4.0 to about 6.0.

Component (B) includes from about 15 wt % to about 2 wt % of an elastomeric polymer dispersed in the continuous phase. The elastomeric polymer is composed of an ethylene/propylene copolymer containing from about 55 wt % to about 70 wt % units derived from ethylene. The multimodal propylene impact copolymer composition has one, some, or all of the following properties:

(i) an MFR from about 1.5 g/10 min to about 6.0 g/10 min;
(ii) a flexural modulus greater than about 240 kpsi; and/or
(iii) a notched Izod impact strength from about 1.0 ft-lb/in to about 4.0 ft-lb/in.

In an embodiment, the thermoformed article is selected from a sheet, a container, a cup, and combinations thereof.

The present disclosure provides another article. In an embodiment, a thermoformed container is provided. The thermoformed container includes a multimodal propylene impact copolymer composition composed of components (A) and (B).

Component (A) includes from about 85 wt % to about 98 wt % of a continuous phase composed of (i) a first propylene-based polymer with an MFR from about 0.1 g/10 min to about 1.5 g/10 min and (ii) a second propylene-based polymer. The continuous phase has (iii) a polydispersity index (PI) from about 4.0 to about 6.0.

Component (B) includes from about 15 wt % to about 2 wt % of an elastomeric polymer dispersed in the continuous phase (A). The elastomeric polymer includes an ethylene/propylene copolymer containing from about 55 wt % to about 70 wt % units derived from ethylene.

The thermoformed container has a topload compression strength at least 10% greater than the topload compression strength of a second thermoformed container composed of a monomodal propylene impact copolymer composed of component (B) and having the same MFR as the multimodal propylene impact copolymer, the containers thermoformed under standard conditions.

In an embodiment, the thermoformed container is a cup.

An advantage of the present disclosure is an improved propylene impact copolymer composition.

An advantage of the present disclosure is a multimodal propylene impact copolymer that provides improved rigidity and can be molded on conventional thermoforming equipment including conventional deep-draw thermoforming equipment.

An advantage of the present disclosure is a multimodal propylene impact copolymer resin with high stiffness and requires only a minimal amount of elastomer for toughness.

An advantage of the present disclosure is an improved thermoformed article.

An advantage of the present disclosure is a thermoformed article with improved stiffness while maintaining desired impact strength.

An advantage of the present disclosure is an improved thermoformed cup.

An advantage of the present disclosure is a down-gauged thermoformed container.

An advantage of the present disclosure is a thermoformed container with improved topload compression strength and good processability.

An advantage of the present disclosure is a thermoformed cup with improved topload compression strength.

DETAILED DESCRIPTION

The present disclosure provides a multimodal propylene impact copolymer composition. A "multimodal propylene impact copolymer," as used herein, is a heterophasic polymeric composition having a continuous phase with a discontinuous phase dispersed therein, the continuous phase composed of two or more propylene-based polymers. In an embodiment, the continuous phase is a continuous phase (or matrix) and the discontinuous phase is an elastomeric polymer (or elastomer).

A "propylene-based polymer," as used herein, is a polymer that comprises a majority weight percent polymerized propylene monomer (based on the total amount of polymerizable monomers), and optionally may comprise at least one polymerized comonomer. The propylene-based polymer may be propylene homopolymer or propylene copolymer. Nonlimiting examples of suitable comonomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, the propylene-based polymer is propylene homopolymer.

The discontinuous phase is dispersed in the continuous phase. In an embodiment, the discontinuous phase is an elastomeric polymer. As used herein, an "elastomeric polymer" is a rubber-like polymer which can be stretched to at least twice its original length and which retracts very rapidly to approximately its original length when the force exerting the stretching is released. Non-limiting examples of suitable of elastomeric polymers include natural rubber (NR), synthetic polyisoprene (IR), butyl rubber (copolymer of isobutylene and isoprene, IIR), halogenated butyl rubbers (chloro-butyl rubber: CIIR; bromo-butyl rubber: BIIR), polybutadiene (BR), styrene-butadiene rubber (SBR), nitrile rubber, hydrogenated nitrile rubbers, chloroprene rubber (CR), polychloroprene, neoprene, ethylene/$C_3$-$C_{10}$ α-olefin copolymer, EPR (ethylene-propylene rubber) and EPDM rubber (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA) chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polystafide rubber, and blends thereof. The elastomeric polymer may be cured or uncured.

In an embodiment, the elastomeric polymer is an ethylene/propylene copolymer.

In an embodiment, a multimodal propylene impact copolymer composition is provided and includes (A) from about 80 wt or about 85 wt %, or about 86 wt % to about 90 wt %, or about 95 wt %, or about 96 wt %, or about 98 wt % of a continuous phase and (B) from about 2 wt %, or about 4 wt %, or about 5 wt %, to about 10 wt %, or about 14 wt %, or about 15 wt %, or about 20 wt %, of an elastomeric polymer. The weight percent of the continuous phase and the elastomeric polymer is based on the total weight of the multimodal propylene impact copolymer composition.

The continuous phase (A) includes a first propylene-based polymer and a second propylene-based polymer. The first propylene-based polymer has an MFR from about 0.1 g/10 min, or 0.5 g/10 min to about 1.0 g/10 min or 1.5 g/10 min. The second propylene-based polymer is different than the first propylene-based polymer. Propylene-based polymers that are "different than" one another are polymers that have at least one uncommon (not the same) property—nonlimiting properties being melt flow rate (MFR), polydispersity index (PI), melting point, xyiene solubles (XS), and/or comonomer content.

The first propylene-based polymer and the second propylene-based polymer form a continuous phase with a PI (or continuous phase PI) from about 4.0 or about 4.5, to about 5.0, or about 5.5 or about 6.0.

In an embodiment, the continuous phase of the multimodal propylene impact copolymer includes greater than 50 wt %, or about 55 wt % to about 70 wt %, or about 65 wt %, or about 60 wt % of the first propylene-based polymer and less than 50 wt %, or about 45 wt % to about 30 wt %, or about 35 wt %, or about 40 wt % of the second propylene-based polymer. Weight percent is based on the total weight of the continuous phase.

In an embodiment, the first propylene-based polymer is a propylene homopolymer and the second propylene-based polymer is a propylene homopolymer different than the first propylene homopolymer. The second propylene homopolymer has an MFR greater than the MFR of the first propylene homopolymer. The first propylene homopolymer has a MFR of about 0.1 g/10 min, or about 0.5 g/10 min to about 1.0 g/10 min or 1.5 g/10 min. The second propylene homopolymer has a MFR from about 3.5 g/10 min, or about 4.5 g/10 min to about 8.5 g/10 min, or about 7.5 g/10 min, or about 6.5 g/10 min. The continuous phase containing the first propylene homopolymer and the second propylene homopolymer has an MFR. (or continuous phase MFR) from about 2 g/10 min, or about 3 g/10 min to about 6 g/10 min, or about 5 g/10 min, or about 4 g/10 min.

In an embodiment, the elastomeric polymer (B) dispersed in the continuous phase is an ethylene/propylene copolymer. The ethylene/propylene copolymer contains from about 30 wt %, or about 40 wt %, or about 45 wt %, or about 50 wt % to greater than about 50 wt %, or about 60 wt or about 65 wt %, or about 70 wt % units derived from ethylene. Weight percent of units derived from ethylene is based on the total weight of the ethylene/propylene copolymer, otherwise known as ethylene content or Ec.

In an embodiment, the elastomeric polymer (B) is an ethylene/propylene copolymer with from about 55 wt % to about 65 wt %, or about 60 wt % units derived from ethylene. Weight percent is based on the total weight of the ethylene/propylene copolymer.

In an embodiment, the multimodal propylene impact copolymer composition contains from about 3.0, or about 3.5, to about 4.0, or about 4.5 units derived from ethylene. Weight percent ethylene is based on the total weight of the multimodal propylene impact copolymer, or Et (ethylene total).

The multimodal propylene impact copolymer composition has a flexural modulus greater than about 240 kpsi, or from about 240 kpsi to about 300 kpsi, or about 270 kpsi. The multimodal propylene impact copolymer composition also has a room temperature (RI) notched Izod impact strength from about 2.0 ft-lb/in to about 4.0 ft-lb/in, or about 3.0 ft-lb/in.

In an embodiment, the multimodal propylene impact copolymer is nucleated and has a flexural modulus greater than about 240 kpsi, or from about 240 kpsi to about 300 kpsi, or about 270 kpsi; and also has a room temperature (RT) notched Izod impact strength from about 2.0 ft-lb/in to about 4.0 ft-lb/in, or about 3.0 ft-lb/in.

The multimodal propylene impact copolymer composition has an MFR (or overall MFR) from about 1.5 g/10 min, or about 2 g/10 min, or about 3 g/10 min, to about 4.0 g/10 min, or about 5.0 g/10 min, or about 6.0 g/10 min. In an embodiment, the multimodal propylene impact copolymer composition has an MFR (overall MFR) from about 3.0 g/1.0 to about 5.0 g/10 min, or about 3.8 g/10 min.

In an embodiment, the multimodal propylene impact copolymer includes a continuous phase (A) having a PI from about 5.0 to about 5.5, and from about 7.0 wt % to about 7.5 wt % elastomeric polymer (B). The continuous phase includes a first propylene homopolymer and a second propylene homopolymer different than the first propylene homopolymer. The elastomeric polymer (B) includes an ethylene/propylene copolymer having from about 55 wt % to about 65 wt % units derived from ethylene (Ec). The multimodal propylene impact copolymer composition includes from about 4 wt % to about 5 wt % ethylene (Et). The multimodal propylene impact copolymer has an MFR (overall MFR) from about 3.5 g/10 min to about 4.0 g/10 min. The multimodal propylene impact copolymer has a flexural modulus from about 250 kpsi to about 270 kpsi and a RT Izod impact strength from about 2.0 ft-lb/in to about 3.0 ft-lb/in. In an embodiment, the multimodal propylene impact copolymer is nucleated and exhibits the properties set forth in this paragraph.

The multimodal propylene impact copolymer may comprise two or more embodiments disclosed herein.

In an embodiment, the multimodal propylene impact copolymer is in the form of a film. The film may have one or more of any of the foregoing properties disclosed for the aforementioned composition.

For propylene-based polymer, flexural modulus is directly proportional to the level of crystallinity present in the polymer. The degree of crystallinity of a polypropylene is primarily governed by the tacticity of the polymer chains. The tacticity of the polymer chain is based on the alignment of the pendant methyl groups within the polymer chain. The stereochemical configuration of the polypropylene backbone can be isotactic, syndiotactic or atactic. Isotactic polymer chains consist of the pendant methyl groups aligned in the same direction along the polymer backbone. Syndiotactic polymer chains consist of methyl groups aligned in an alternating stereospecificity along the polymer backbone. Atactic polymer chains consist of random pendant methyl orientation along the polymer chain. Isotactic polypropylene exhibits the highest crystallinity.

In an embodiment, the first propylene homopolymer and/or the second propylene homopolymer each have primarily an isotactic stereo-configuration of the polymer chain. This results in the formation of helical structures which enable further formation of lamellae and spherulite crystals—the microstructure resulting in high flexural modulus. As isotacticity increases in the polymer, the flexural modulus or stiffness increases. As isotacticity increases the xylene solubles decrease.

The molecular weight distribution (MWD) also affects the overall morphology for propylene-based polymer. While the tacticity of the polymer dictates the ability of the polymer chains to form into crystalline spherulites, the MWD controls the agility of the molecules to form efficient crystalline macro-structures and also determines the rate of crystallization. The polydispersity index (PI) is an indirect measure of MWD, and is directly proportional to MWD. As the PI (or MWD) increases, the modulus of the polymer also increases.

The elastomeric polymer dispersed within the continuous phase provides impact resistance. The elastomeric polymer acts as an impact modifier by interrupting the fracture propagation through the continuous phase. The efficiency of the elastomeric polymer for material toughening is dependent on the nature of the modifier as well as the amount and dispersion. The glass transition temperature (Tg) of the elastomeric polymer for material toughening is dependent on the nature of the modifier as well as the amount dispersion. The glass transition temperature (Tg) of the elastomeric polymer influences the efficiency of the impact resistance—the lower the Tg, the more efficient the modifier.

In the embodiment, the multimodal propylene impact copolymer composition is produced in a dual loop/gas phase polymerization system. The dual loop/gas phase polymerization system includes at least three reactors: a first slurry reactor (first loop), a second slurry reactor (second loop) and a gas phase reactor. The three reactors operate in series. The first propylene-based polymer is produced in the first slurry reactor, the second propylene-based polymer is produced in the second slurry reactor (in the presence of the first propylene-based polymer), and the elastomer is produced in the gas phase reactor (in the presence of the multimodal continuous phase).

The multimodal propylene impact copolymer composition is optionally nucleated. Addition of a nucleating agent may optimize stiffness and/or cause crystallization of the polymer to begin at a higher temperature, which results in a higher degree of crystallinity (compared to the same multimodal propylene impact copolymer that is not nucleated) and more uniform distribution of crystallinity.

In an embodiment, the multimodal propylene impact copolymer composition is a nucleated multimodal propylene impact copolymer composition. As used herein, "nucleation" is the process by which compounds and compositions are used to produce faster crystallization and/or higher polymer crystallization temperatures. Nucleation is a post-reactor procedure whereby a nucleating agent is blended (typically melt blended) with the multimodal propylene impact copolymer composition. As used herein, "nucleating agents" are compounds utilized to provide nucleation sites for crystal growth during cooling of a polyolefin molten formulation. Nucleating agents increase the rate at which nucleation events occur, often enabling significant crystallization at temperatures higher than possible in the absence of such an agent. Nucleation increases polymer stiffness. A "nucleated multimodal propylene impact copolymer composition" is a multimodal propylene impact copolymer that has been subjected to nucleation. Bounded by no particular theory, it is believed that nucleation improves the stiffness and the optical properties of propylene-based polymer compared to propylene-based polymer devoid of a nucleating agent.

Nonlimiting examples of suitable nucleating agents include 1,3-O-2,4-bis(3,4-dimethylbenzylidene)sorbitol (hereinafter DMDBS), available from Milliken Chemical under the trade name Milad® 3988, sodium benzoate, sodium 2,2'-methylene-bis-(4,6-di-tert-butylphenyl) phosphate (from Asahi Denka Kogyo K. K., known as NA-11), aluminum bis[2,2'-methylene-bis-(4,6-di-tert-butylphenyl)phosphate] (also from Asahi Denka Kogyo K. K., known as NA-21), talc, and the like.

In an embodiment, the nucleating agent is NA-11.

The present disclosure provides an article. The article is a molded article. Nonlimiting examples of molded articles include an injected molded article, an extruded article, a profile-extruded article, a thermoformed article, and a blow molded article. Nonlimiting examples of suitable articles include film (cast film and/or blown film), strapping, tapes, twine, pipe, tubing, coating for wire and cable, sheet and corrugated sheet, cups, pails, bottles, containers, boxes, automotive parts, appliances, consumer goods, closures, and lids. A "sheet," as used herein, is a polymeric structure having a thickness of greater than or equal to 10 mils.

A "thermoformed article," as used herein, is a thermoplastic sheet heated at least to its softening point and fitted along the contours of a mold with pressure (positive and/or negative). The thermoformed article then is removed from the mold after cooling below its softening point. Nonlimiting examples of thermoformed articles include sheets, trays, containers, lids and cups.

A nonlimiting example of a thermoforming process for a container begins with a sheet (or a film) of thermoplastic material. The sheet is typically produced using an extruder, sheet die, and three-roll stack of chill rolls. The sheet may be wound into a roll or cut into lengths to be fed later into a thermoformer. The sheet can also be directly fed in-line into a thermoformer. In the thermoformer, the thermoplastic sheet is heated in an oven to a temperature suitable for thermoforming, i.e., this temperature may be below, at, or above the melting point of the thermoplastic material depending on the process used. The heated sheet/film is then fed (indexed) into a mold cavity and formed into an article under conditions using vacuum and/or pressure and optionally mechanical (plug) assist. The mold cavity imparts the shape of the container as the plastic material is drawn into the mold and the mold also cools the material to a temperature significantly below the melting point so that the article has solidified adequately to retain its shape upon removal from the mold. The processing time for a thermoforming operation is typically between 3 and 10 seconds for an article such as a cup, but may be faster for smaller/thinner articles, or longer for thick sheet thermoforming. Further descriptions of thermoforming polypropylene can be found in the book: "*Polypropylene. The Definitive User's Guide and Databook*" by Maier and Calafut, published by Plastics Design Library, 1998.

In an embodiment, the thermoformed article is composed of the multimodal propylene impact copolymer composition as disclosed above. In particular, the thermoformed article is composed of a multimodal propylene impact copolymer composition which includes
 A. from about 85 wt % to about 98 wt % of a continuous phase comprising
  (i) a first propylene-based polymer with an MFR from about 0.1 g/10 min to about 1.5 g/10 min;
  (ii) a second propylene-based polymer;
  (iii) the continuous phase having a polydispersity index (PI) from about 4.0 to about 6.0; and
 B. from about 15 wt % to about 2 wt % of an elastomeric polymer dispersed in the continuous phase, the elastomeric polymer comprising an ethylene/propylene copolymer comprising from about 55 wt % to about 70 wt % units derived from ethylene.

The resin used in the thermoformed article has an MFR from about 1.5 g/10 min to about 6.0 g/10 min and a flexural modulus greater than 240 kpsi, or greater than 240 kpsi to about 300 kpsi. The thermoformed article also has a room temperature (RT) notched Izod. impact strength from about 1.0 ft-lb/in to about 4.0 ft-lb/in. In a further embodiment, the thermoformed article is a container.

Applicant surprisingly discovered that the multimodal propylene impact copolymer composition unexpectedly provides thermoformed articles, and thermoformed containers in particular, with the improved stiffness (flex modulus greater than 240 kpsi) while simultaneously maintaining suitable impact strength (RT notch Izod from 1.0 ft-lb/in to 4.0 ft-lb/in). The multimodal propylene impact copolymer composition also advantageously has an improved continuous phase PI (4.0-6.0), which is excellent for thermoforming applications and thermoforming processability in particular.

The present disclosure provides a thermoformed container. In an embodiment, a thermoformed container is provided and is composed of a multimodal propylene impact copolymer composition. The multimodal propylene impact copolymer composition may be any multimodal propylene impact copolymer composition as disclosed herein. The multimodal propylene impact copolymer composition includes
 A. from about 85 wt % to about 98 wt % of a continuous phase comprising
  (i) a first propylene-based polymer with an MFR from about 0.1 g/10 min to about 1.5 g/10 min;
  (ii) a second propylene-based polymer;
  (iii) the continuous phase having a polydispersity index (PI) from about 4.0 to about 6.0; and
 B. from about 15 wt % to about 2 wt % of an elastomeric polymer dispersed in the continuous phase, the elastomeric polymer comprising an ethylene/propylene copolymer comprising from about 55 wt % to about 70 wt % units derived from ethylene.

The thermoformed container made from the present multimodal propylene impact copolymer (hereafter the "multimodal container") has a topload compression strength at least 10% greater than the topload compression strength of a second thermoformed container made from a monomodal propylene impact copolymer (hereafter the "monomodal container"). A "monomodal propylene impact copolymer" is a heterophasia polymeric composition having a continuous phase and a discontinuous phase dispersed therein, the continuous phase composed of a single propylene-based polymer. In an embodiment, the multimodal container and the monomodal container each have a respective multi-/monomodal propylene impact copolymer with (i) a continuous phase with the same, or substantially the same, MFR and (ii) the same, or substantially the same, discontinuous phase.

The present thermoformed container (the multimodal container) and the second thermoformed container (the monomodal container) are formed under standard conditions. The term "standard conditions," as used herein, are thermoforming process parameters that are the same (or substantially the same) across two or more thermoformed articles. A nonlimiting example of thermoformed articles formed under standard conditions includes introducing the same amount of polymer into two identical thermoforming molds (or the same thermoforming mold at different times) under the same, or substantially the same, thermoforming conditions (temperature, pressure, mold type, and mold duration) Thermoforming in each mold is performed under the same thermoforming conditions. Article properties (sidewall thickness, topload strength, etc.) are measured for each thermoformed article. In this way, thermoforming under standard conditions enables a comparable evaluation of the structural features and/or the polymer properties of the multimodal container and the monomodal container.

In an embodiment, the multimodal container has a topload compression strength that is at least 10% greater than, or at least 10% greater than to 20% greater than the topload compression strength of the monomodal container, the multimodal container and the monomodal container thermoformed under standard conditions.

In an embodiment, the multimodal container is a cup and the monomodal container is a cup (formed under standard conditions).

Figure 1:
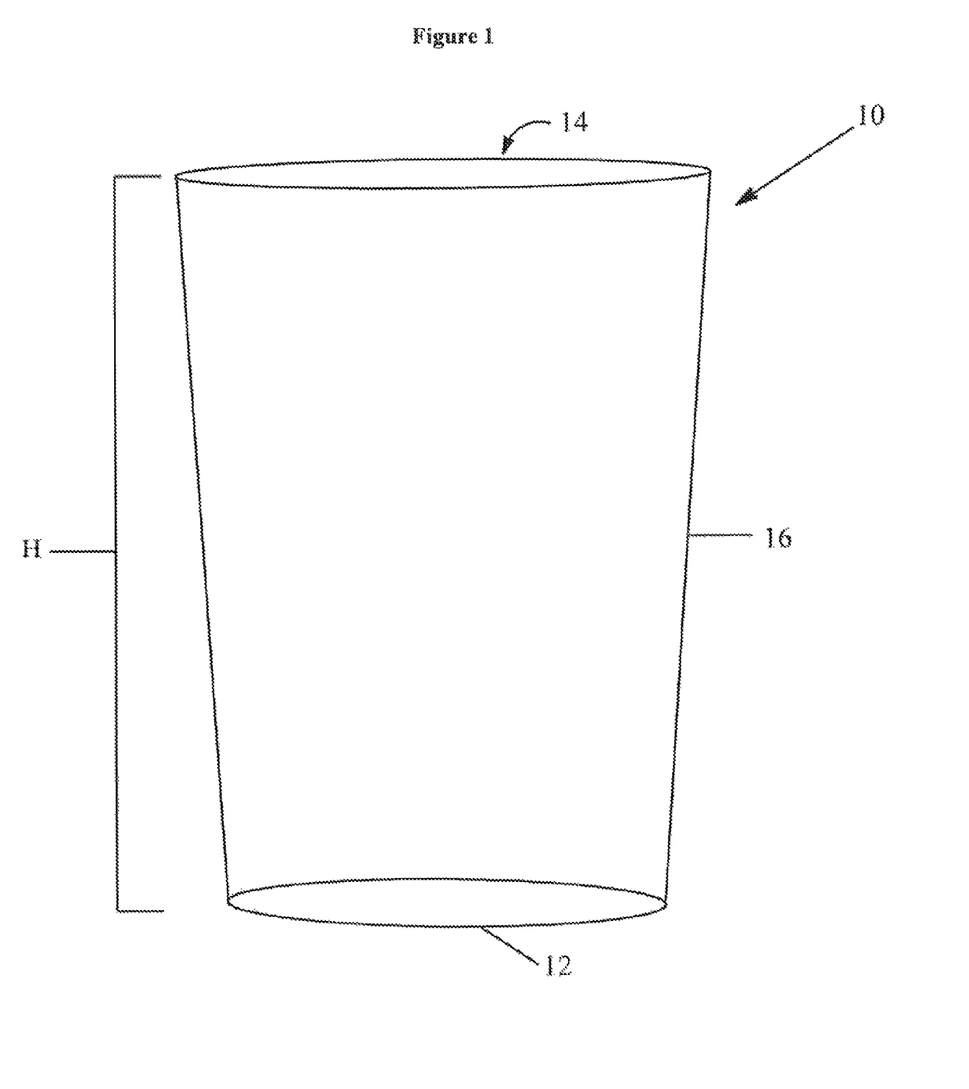
FIG. 1 is a perspective view of a thermoformed cup in accordance with an embodiment of the present disclosure.

The present disclosure provides a thermoformed cup. In an embodiment, a thermoformed cup 10 is provided and includes a closed bottom wall 12, an open top 14 at an opposite end of the closed bottom wall 12 as shown in FIG. 1. A sidewall 16 extends between the closed bottom wall 12 and the open top 14 and defines a height H of the thermoformed cup 10. The diameter of the sidewall 16 may be constant or may be variable along height H.

The thermoformed cup 10 may be formed to a volume as desired. Nonlimiting examples of suitable cup volumes range from 59 ml (2 ounces) to 710 ml (24 ounces), or 946 ml (32 ounces) or even 1893 ml (64 ounces) and any value therebetween. The cup 10 has a mass from 5 grams to 25 grams.

In an embodiment, the cup 10 has a height H of 146 mm (5¾ inches), the bottom wall 12 with a length of 59 mm (2⁵⁄₁₆ inches), an open top 14 with a length of 98 mm (3⅞ inches), and a sidewall 16 with a length of 112 mm (4⁷⁄₁₆ inches).

The sidewall 16 has a thickness from about 127 microns (5 mils) to about 381 microns (15 mils) or about 178 microns (7 mils) to about 254 microns (10 mils).

In an embodiment, the thermoformed cup 10 is composed of any multimodal propylene impact copolymer composition as disclosed above.

In an embodiment, the thermoformed cup is composed of a nucleated multimodal propylene impact copolymer composition.

In an embodiment, the thermoformed cup holds a volume of 20 ounces, has a mass of about 19 g, and has a topload compression strength greater than 38 lbf, or greater than 38 lbf to about 44 lbf.

In an embodiment, any of the foregoing thermoformed articles is suitable for food-contact applications.

Any of the foregoing multimodal propylene impact copolymer compositions and/or thermoformed articles may include one or more of the following additives: antioxidants, antistatics, antacids, antiblocks (i.e., for improved denesting), stabilizers, lubricants, mold release agents, ultraviolet absorbers/stabilizers, dyes, pigments, antifungals, anti-microbial agents, processing aids, waxes, slip agents, and any combination of the foregoing.

The present thermoformed article, the present thermoformed container and/or the present thermoformed cups may comprise two or more embodiments disclosed herein,

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. Subranges denoted by "greater than" and/or "less than" are considered to be expressly stated for any range disclosed herein. In other words, any numerical range recited herein includes any value or subrange within the stated range. Numerical ranges have been recited, as discussed herein, reference melt index, melt flow rate, and other properties.

The term "about" includes the numeric value presented and upper/lower variance thereto.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

Test Methods $^{13}$C NMR characterization (ethylene content) is performed as follows:

Sample Preparation

The samples are prepared by adding approximately 2.7 g of a 50/50 mixture of tetrachloroethane-d$_2$/orthodichlorobenzene containing 0.025 M Cr(AcAc)$_3$ to 0.20 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters

The data are collected using a Bruker 400 MHz spectrometer equipped with a Bruker Dual DUL high-temperature CryoProbe. The data are acquired using 1280 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition Flexural modulus, 1% secant, is determined in accordance with ASTM D790/D4101 using injection molded tensile bars with the following dimensions: ⅛ in×½ inch×6½ inch.

Heat Distortion Temperature (EDT) at 66 psi is measured in accordance with ASTM D 648/D 4101.

Intrinsic Viscosity (IV)

The polymers are analyzed by gel permeation chromatography (GPC) on a Polymer Laboratories PL-GPC-220 high temperature chromatographic unit equipped with three linear mixed bed columns, 300×7.5 mm (Polymer Laboratories PL gel Mixed B (10-micron particle size)). The oven temperature is set at 160° C. with the autosampler hot zone at 160° C. and the warm zone at 145° C. The solvent is 1,2,4-trichlorobenzene (TCB) containing 200 ppm 2,6-di-t-butyl-4-methylphenol. The flow rate is 1.0 milliliter/minute and the injection size is 100 microliters. A 0.15% by weight solution of the sample is prepared for injection by dissolving the sample in nitrogen purged 1,2,4-trichlorobenzene containing 200 ppm 2,6-di-t-butyl-4-methylphenol for 2.5 hrs at 160° C. with gentle mixing. The molecular weight is determined by using ten narrow molecular distribution polystyrene standards (from Polymer Laboratories, EasiCal Psi ranging from 580-7,500,000 g/mole) in conjunction with their elution volumes. The equivalent polypropylene molecular weights were determined by using appropriate Mark-Houwink coefficients for polypropylene in the Mark-Elouwink equation:

$$(\eta) = KM^a$$

where $K_{pp}$=1.90 E-04, $a_{pp}$=1.725 and $K_{ps}$=1.26 E-04, $a_{ps}$=0.702.

The response of the LS detector (Precision Instruments), the differential viscometer (Viscotek), and the refractive index detector (Polymer Labs) are calibrated using the detector response of an established HDPE sample, 38-4. with Mw=115,000 and IV=1.845 dL/g, run at 2,000 mg/mL.

The IV is measured using the viscometer detector on the GPC. The IV of the impact copolymer ICP and the continuous phase (matrix) can be measured directly.

Isotacticity is measured using a Bruker 400 MHz spectrometer equipped with a Bruker Dual DUL high-temperature CryoProbe. The data is acquired using 320 transients per data tile, a 6 sec pulse repetition delay (4.7 s delay+1.3 s acq. time), 90 degree flip angles, and inverse gated decoupling with a sample temperature of 120° C. All measurements are made on non-spinning samples in locked mode. Samples are homogenized immediately prior to insertion into the heated (125° C.) NMR Sample changer, and are allowed to thermally equilibrate in the probe for 7 minutes prior to data acquisition. The $^{13}$C NMR chemical shifts are internally referenced to the mmmm isotactic pentad at 21.90 ppm.

Melt flow rate (MFR) is measured in accordance with ASTM D 1238-01 test method at 230° C. under a 2.16 kg weight for propylene-based polymers.

Notched-Izod impact strength is tested in accordance with ASTM D 256 and ASTM D 4101 using notched injection molded tensile bars and a test temperature of room temperature (23° C.).

Polydispersity Index (PI) is measured using a Rheometrics 800 cone and plate rheometer from TA Instruments, operated at 180° C., using the method of Ziechner and Patel, (1981) "A Comprehensive Study of Polypropylene Melt Rheology" Proc. of the 2$^{nd}$ World Congress of Chemical Eng., Montreal, Canada. In this method the cross-over modulus is determined, and the PI is defined as 100,000/cross-over modulus (in Pascals). The polymer is pressed at 365° F. under pressure for 6 minutes.

Dynamic Mechanical Analysis (DMA) is performed at 180° C., at a frequency sweep from 500 to 0.01 radians per second.

Topload compression strength is measured using an Instron 5500 with a load cell capable of measuring 0 to 100 pounds of force at 0-1 inch displacement and according to the following procedure.

Figure 2:
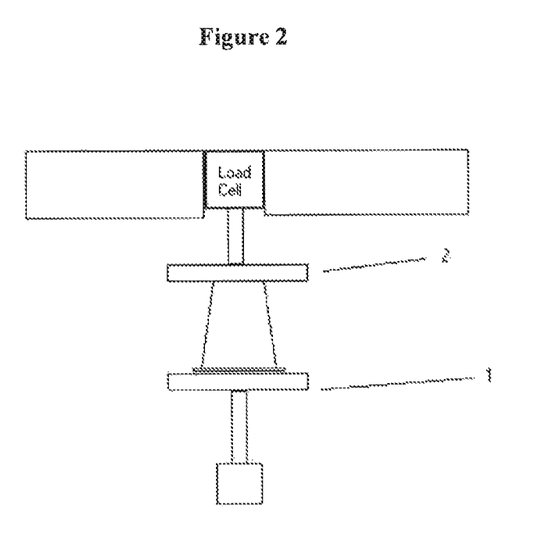
FIG. 2 is a schematic representation of a topload compression test device.

Step 1 All tests are run at 22.8° C. (73° F.), 50% humidity.
Step 2 Install the appropriate matron fixture associated with top load cup compression. See FIG. 2.
Step 3 Use Method 29, "Cup Crush Test", within the Instron Series IX program. This sets compression speed to 5 in/min, and specifies a total compression stroke of 1 inch.
Step 4 Measure the length of the cup.
Step 5 Load the cup between the two compression fixtures.
Step 6 Adjust the compression fixture using the Instron control unit to lower the fixture within 1/16" of touching the cup.
Step 7 Click Start Test, and watch to ensure there will be no contact between the support fixture (1) and the compression fixture (2). See FIG. 2. Stop the test immediately if contact is imminent.
Step 8 Remove the sample from the fixture and return the upper fixture to its set position, by using the return button on the frame controller.
Step 9 Repeat steps 6-9 for how many samples are required within the set.
Step 10 Click End Sample to export and print data.
Step 11 The load vs, displacement curve within Matron is used to generate all of the test results. These include max load, displacement at max load, energy at break, load at 0.5 inches, and load at initial yield.

Xylene Solubles (XS) is measured according to the following procedure: 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H400-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PolyCAL™ polystyrene standards.

By way of example and not by limitation, examples of the present disclosure will now be provided.

EXAMPLES

Five polymers are produced in a dual loop/gas phase polymerization system. The polymers are provided in Table 1 below.

Run 9 has 8-16% higher modulus at similar RT-N-Izod values compared to Runs 1, 2, 3, and 10.

Resin from Run 03, Run 09, and a comparative sample are extruded and in-line thermoformed on OMV Model F25 thermoforming line under the thermoforming conditions (below) set forth in Table 3 below.

The OMV Model F25 thermoforming line (F25) is equipped with a single cavity 409 diameter, 16 ounce cup mold. The cycle time for the F25 is about 3.5 seconds (17 strokes/min), and mold temperature is 20° C. The F25 has a form air pressure box top plug assist and vacuum on the bottom or cavity side. For all runs the sheet temperature in the oven is approximately 160° C. on the surface and estimated at 120-130° C. In the core of the sheet.

The comparative sample is a nucleated propylene/ethylene impact copolymer (hereafter comparative sample) with properties set forth in Table 2.

TABLE 2

Comparative Sample Properties

| Property | Value | | ASTM |
|---|---|---|---|
| Density - Specific Gravity (Method B) | 0.902 | sp gr 23/23° C. | D792 |
| Melt Flow Rate (230° C./ 2.16 kg - L) | 3.8 | g/10 min | D1238 |
| Tensile Strength @ Yield | 4700 | psi | D638 |
| Tensile Elongation @ Yld | 7.0% | | D638 |
| Flexural Modulus | 1% Secant 230000 | psi | D790 |
| Notched Izod Impact (73° F.) | 2.00 | ft-lb/in | D256 |
| DTUL @66 psi - Unannealed | 244° | F. | D648 |

TABLE 1

| Run # | XS wt % | Fc wt % | Ec wt % | Et wt % | IV ICP | IV matrix | PI | Overall MFR (dg/min) | Flex Mod, 1% Secant kpsi | RT N- Izod ft-lb/in | HDT 66 psi ° C. | Production config |
|---|---|---|---|---|---|---|---|---|---|---|---|---|
| 1 | 8.9 | 7.1 | 57.8 | 4.1 | 1.8 | 1.8 | | 3.96 | 232 | 2.1 | NM | monomodal/gas |
| 2* | 1.3 | N/A | N/A | N/A | N/A | 1.6 | 5.1 | 3.34 | 290 | 0.8 | 130 | bimodal/no gas |
| 3* | 8.4 | 7.3 | 59.1 | 4.4 | 1.7 | 1.9 | | 3.58 | 250 | 2.1 | NM | bimodal/gas |
| 9* | 7.7 | 7.0 | 60.7 | 4.3 | 1.6 | 1.9 | | 3.72 | 270 | 3.0 | 120 | bimodal/gas |
| 10* | 8.3 | 7.8 | 58.0 | 4.5 | NM | NM | | 3.73 | 250 | 3.5 | 118 | monomodal/gas |

IV measured using TCB at 160° C.
N/A = Not Applicable
NM = Not Measured
*= nucleated, additive package is 750 ppm sodium benzoate, 1000 ppm I-1010, 1000 ppm I-168, 3500 ppm GMS.

TABLE 3

Resin/Blend
comparative sample + 4% white Master Batch (MB)
Run 3 + 4% MB
Run 9 + 4% MB

| Parameters | Comparative sample | Run 3 | Run 9 |
|---|---|---|---|
| Die gap (mils) | 80 | 80 | 80 |
| Sheet thickness (19 g cup) | 80 | 79 | 82 |
| Sheet thickness (17 g cup) | 75 | 76 | 77 |
| Sheet thickness (16 g cup) | | | 72 |
| Melt temperature | 209° C. (408° F.) | 211° C. (411.8° F.) | 212° C. (413.6° F.) |
| Top Roll Temperature | 75° C. (167° F.) | 75° C. (167° F.) | 80° C. (176° F.) |
| Middle Roll Temperature | 85° C. (185° F.) | 85° C. (185° F.) | 85° C. (185° F.) |
| Bottom Roll Temperature | 80° C. (176° F.) | 80° C. (176° F.) | 85° C. (185° F.) |
| Rate (lb/hr) | 256.7 | 231.4 | 252.3 |
| Line speed (ft/min) | 2.8 | 2.8 | 2.8 |
| Extruder amps | 99 | 93 | 94 |
| Gear Pump rpm | 29.5 | 26.6 | 29 |
| Rolling Bank | Pencil size | Pencil size | Pencil size |

Each polymer—comparative sample. Run 3, Run 9—is thermoformed into a 20 ounce cup with a sidewall thickness of 10-15 mil under the thermoforming conditions (i.e., standard conditions) as follows.

The cups are produced on an OMV Model F25 thermoforming line equipped with a single cavity 20 oz cup mold. The cycle time for the F25 is about 3 seconds (17-18 strokes/min), mold temperature is 16-20° C. The F25 has a pressure top plug assist and vacuum on the bottom.

The properties of the thermoformed cups are provided in Table 4.

TABLE 4

20 oz Thermoformed Cups

Current Weight 19.0 g Target

| | Comparative Sample | Run 3 | Run 9 |
|---|---|---|---|
| Actual Weight (g) | 18.8 | 19.1 | 19.0 |
| 30 min Topload Avg (lbf) | 60.5 | 57.1 | 71.0 |
| 4 Week Topload Avg (lbf) | 84.9 | 78.9 | 88.6 |
| 150° F. Topload (lbs) | 37.5 | 38.8 | 43.9 |
| Sidewall Min Thickness (in) | 0.014 Middle | 0.014 Middle | 0.015 Middle |
| Corner Thickness (in) | .013 | .012 | .013 |
| Bottom Thickness (in) | .061 | .061 | .058 |

Run 9 resin exhibits greater than 10% improved topload compression strength compared to Run 3 resin at room temperature. At 150° F., the topload compression strength for Run 9 is also greater than 10% compared to both Run 3 and the Comparative Sample. Run 9 resin exhibits improved rigidity for thermoformed articles and thermoformed containers such as thermoformed cups in particular. Run 09 resin exhibits improved rigidity at higher temperatures.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A multimodal propylene impact copolymer composition consisting essentially of:

A. from about 85 wt % to about 98 wt % of a continuous phase having
  (i) a first propylene homopolymer with an MFR from greater than 0.1 g/10 min to about 1.5 g/10 min;
  (ii) a second propylene-based polymer having an MFR greater than the MFR of the first propylene-based polymer;
  (iii) the continuous phase having a polydispersity index (PI) from about 4.0 to about 6.0;
B. from about 15 wt % to about 2 wt % of an elastomeric polymer dispersed in the continuous phase, the elastomeric polymer being an ethylene/propylene copolymer with from about 55 wt % to about 70 wt % units derived from ethylene; and the multimodal propylene impact copolymer composition having an MFR from about 1.5 g/10 min to about 6.0 g/10 min;
a flexural modulus greater than about 240 kpsi;
and a notched Izod impact strength from about 1.0 ft-lb/in to about 4.0 ft-lb/in,
wherein the continuous phase is greater than about 50 wt % to about 70 wt % of the first propylene-based polymer based on the total weight of the continuous phase.

2. The copolymer composition of claim 1 wherein the second propylene-based polymer is a propylene homopolymer different than the first propylene homopolymer.

3. The copolymer composition of claim 1 wherein the continuous phase has an MFR from about 2.0 g/10 min to about 6.0 g/10 mm.

4. The copolymer composition of claim 1 wherein the ethylene/propylene copolymer has from about 3.0 wt % to about 6.5 wt % units derived from ethylene.

5. The copolymer composition of claim 1 wherein the ethylene/propylene copolymer has an MFR from about 3.0 g/10 min to about 5.0 g/10 min.

6. The copolymer composition of claim 1 wherein the elastomeric polymer (B) is an ethylene/propylene copolymer with from about 55 wt % to about 65 wt % units derived from ethylene.

7. The copolymer composition of claim 1 having a continuous phase (A) with a PI from about 5.0 to about 6.0; and from about 7.0 wt % to about 9.0 wt % elastomeric polymer (B) being an ethylene/propylene copolymer, the copolymer composition having from about 3.8 wt % to about 5.9 wt % total ethylene (Et).

8. The copolymer composition of claim 1 wherein the copolymer is a nucleated copolymer composition.

9. A sheet comprising a multimodal propylene impact copolymer of claim 1.

10. A thermoformed article consisting essentially of:
a multimodal propylene impact copolymer composition having
   A. from about 85 wt % to about 98 wt % of a continuous phase having
      (i) a first propylene homopolymer with an MFR from greater than 0.1 g/10 min to about 1.5 g/10 min;
      (ii) a second propylene-based polymer;
      (iii) the continuous phase having a polydispersity index (PI) from about 4.0 to about 6.0;
   B. from about 15 wt % to about 2 wt % of an elastomeric polymer dispersed in the continuous phase, the elastomeric polymer being an ethylene/propylene copolymer with from about 55 wt % to about 70 wt % units derived from ethylene; and
   the multimodal propylene impact copolymer composition having an MFR from about 1.5 g/10 min to about 6.0 g/10 min;
   a flexural modulus greater than about 240 kpsi; and
   a notched Izod impact strength from about 1.0 ft-lb/in to about 4.0 ft-lb/in.

11. The thermoformed article of claim 9 wherein the thermoformed article is selected from the group consisting of a sheet, a container, a cup, and combinations thereof.

12. A thermoformed container consisting essentially of:
a multimodal propylene impact copolymer composition having
   A. from about 85 wt % to about 98 wt % of a continuous phase having
      (i) a first propylene homopolymer with an MFR from greater than 0.1 g/10 min to about 1.5 g/10 min;
      (ii) a second propylene-based polymer having an MFR greater than the MFR of the first propylene-based polymer;
      (iii) the continuous phase having a polydispersity index (PI) from about 4.0 to about 6.0;
   B. from about 15 wt % to about 2 wt % of an elastomeric polymer dispersed in the continuous phase, the elastomeric polymer being an ethylene/propylene copolymer with from about 55 wt % to about 70 wt % units derived from ethylene; and
   the thermoformed container having a topload compression strength at least 10% greater than the topload compression strength of a second thermoformed container composed of a monomodal propylene impact copolymer consisting of component (B) and having the same MFR as the multimodal propylene impact copolymer, the containers thermoformed under standard conditions.

13. The thermoformed container of claim 12 wherein the thermoformed container is a cup.

* * * * *